US007039692B2

(12) United States Patent
Foster et al.

(10) Patent No.: US 7,039,692 B2
(45) Date of Patent: May 2, 2006

(54) METHOD AND APPARATUS FOR MAINTAINING PROFILES FOR TERMINALS IN A CONFIGURABLE DATA PROCESSING SYSTEM

(75) Inventors: Robert Kimberlin Foster, Austin, TX (US); Walter Manfred Lipp, Georgetown, TX (US); Charles Andrew McLaughlin, Round Rock, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/798,286

(22) Filed: Mar. 1, 2001

(65) Prior Publication Data

US 2002/0124063 A1    Sep. 5, 2002

(51) Int. Cl.
G06F 15/177 (2006.01)

(52) U.S. Cl. .................. 709/221; 709/201; 709/220; 709/223; 709/224; 709/249

(58) Field of Classification Search ............... 709/201, 709/220, 221, 223, 224, 249
See application file for complete search history.

(56) References Cited

U.S. PATENT DOCUMENTS 5,253,344 A * 10/1993 Bostick et al. ............... 710/8
5,659,756 A * 8/1997 Hefferon et al. ............ 710/200
5,721,817 A * 2/1998 Kurihara et al. ............ 709/227
5,841,972 A * 11/1998 Fanshier ..................... 709/220
5,961,642 A * 10/1999 Lewis ........................... 713/1
6,505,243 B1 * 1/2003 Lortz .......................... 709/220
6,594,695 B1 * 7/2003 Vasamsetti et al. ......... 709/220
6,678,712 B1 * 1/2004 McLaren et al. ............ 718/100
6,684,343 B1 * 1/2004 Bouchier et al. .............. 714/4

FOREIGN PATENT DOCUMENTS

| JP | 09-097241 | 4/1997 |
| JP | 2000-020286 | 1/2000 |
| JP | 2001-034592 | 2/2001 |
| WO | WO97/35255 | 9/1997 |

OTHER PUBLICATIONS

Unisys e-@ction Enterprise Server ES7000 Architecture and Server Strategy, Computopia 2000-7, pp. 47-51.
Unix Server [Primepower] which is appropriate for internet business, Fujitsu Journal, vol. 26, No. 4, 2000, pp. 19-26.

* cited by examiner

Primary Examiner—Kim Huynh
Assistant Examiner—Mohammad Farooq
(74) Attorney, Agent, or Firm—Duke W. Yee; Mark E. McBurney; Peter B. Manzo (57) ABSTRACT

The present invention provides a method, apparatus, and computer implemented instructions for managing a set of objects for a plurality of terminals. The set of objects are stored in a memory, such as a nonvolatile random access memory in a data processing system. The set of objects are used to configure logical partitions within the data processing system. Access to the set of objects is provided to the plurality of terminals through a service processor.

28 Claims, 4 Drawing Sheets

METHOD AND APPARATUS FOR MAINTAINING PROFILES FOR TERMINALS IN A CONFIGURABLE DATA PROCESSING SYSTEM

BACKGROUND OF THE INVENTION

1. Technical Field

The present invention relates generally to an improved data processing system and in particular to a method and apparatus for managing configuration data in a configurable data processing system. Still more particularly, the present invention provides a method and apparatus for maintaining profiles used to configure a configurable data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

The configuration of these different partitions are typically managed through a terminal, such as a hardware system console (HSC). These terminals use objects, also referred to as profiles that are defined and modified in HSC. The profiles are used to configure LPARs within the data processing system. Multiple HSCs may be present and used for maintaining and configuring LPARs in the data processing system. These profiles used to configure the data processing system in LPARs are often required to be accessible to any HSC that is in communication with the data processing system. Maintaining profiles between these HSCs are often difficult and require processes for maintaining synchronization of the profiles at each HSC.

Therefore, it would be advantageous to have improved method, apparatus, and computer implemented instructions for maintaining profiles for different HSCs.

SUMMARY OF THE INVENTION

The present invention provides a method, apparatus, and computer implemented instructions for managing a set of objects for a plurality of terminals. The set of objects are stored in a memory, such as a nonvolatile random access memory in a data processing system. The set of objects are used to configure logical partitions within the data processing system. Access to the set of objects is provided to the plurality of terminals through a service processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
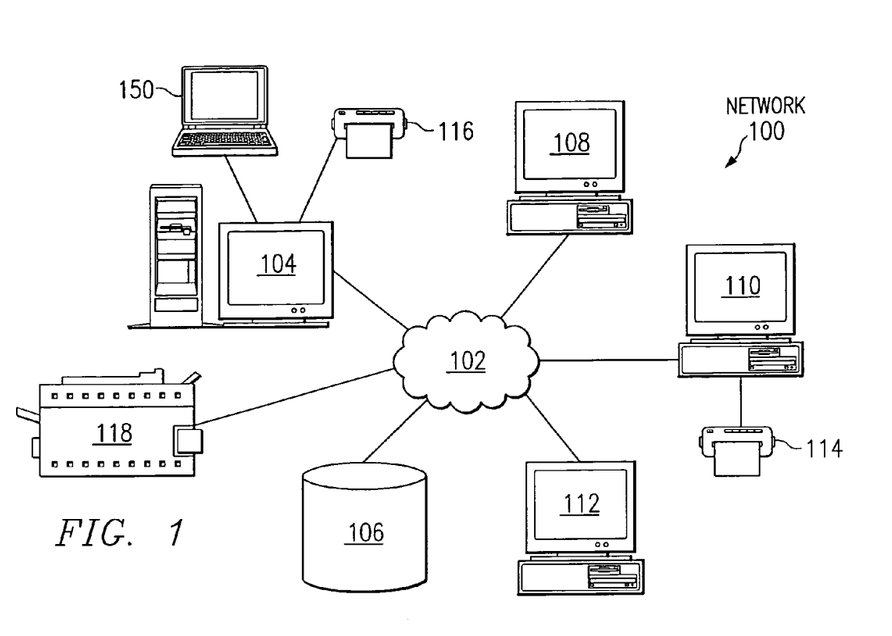
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network 102. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
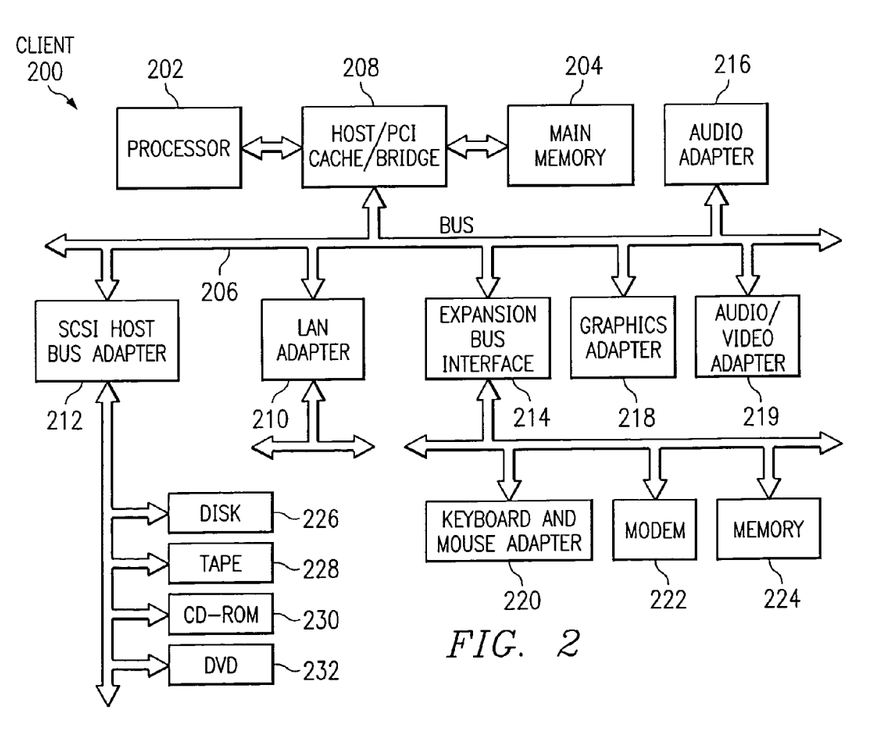
FIG. 2 is a block diagram of a data processing system in accordance with the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as AIX, which is available from International Business Machines Corporation. "AIX is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
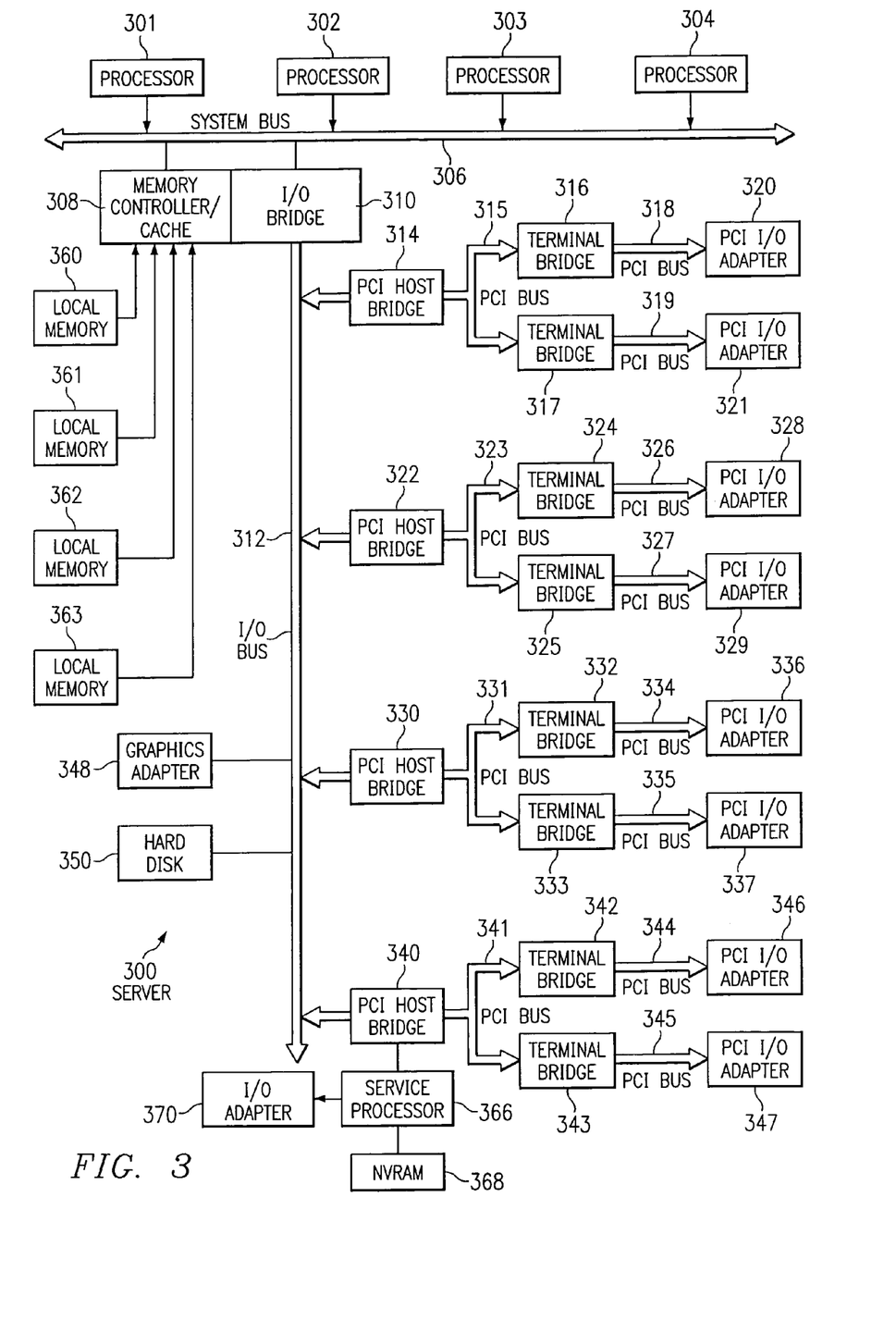
FIG. 3 is a block diagram of a data processing system, which may be implemented as a logically partitioned server.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM pSeries eServer, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a LINUX operating system may be operating within logical partition P3. LINUX is a version of UNIX and is an open source software operating system.

Peripheral component interconnect (PCI) Host bridge 314 connected to I/O bus 312 provides an interface to PCI local bus 315. A number of terminal bridges 316–317 may be connected to PCI bus 315. Typical PCI bus implementations will support four terminal bridges for providing expansion slots or add-in connectors. Each of terminal bridges 316–317 is connected to a PCI I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Management of logical partitions is achieved through terminals, such as hardware system consoles (HSC). This access is provided in these examples through service processor 366, nonvolatile random access memory (NVRAM) 368, and input/output (I/O) adapter 370, which may be implemented as a Universal Asynchronous Receiver Transmitter (UART). HSCs connect to service processor 366 through I/O adapter 370. NVRAM 368 contains objects, such as profiles used to configure and manage logical partitions within data processing system 300. In these examples, the profiles stored in NVRAM 368 are sent to HSCs as they come online or connect to data processing system 300 through I/O adapter 370. This architecture provides a mechanism to avoid having to store profiles for logical partitions at the HSCs. Further, synchronization mechanisms to maintain profiles duplicated at different HSCs also are not required with this architecture.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
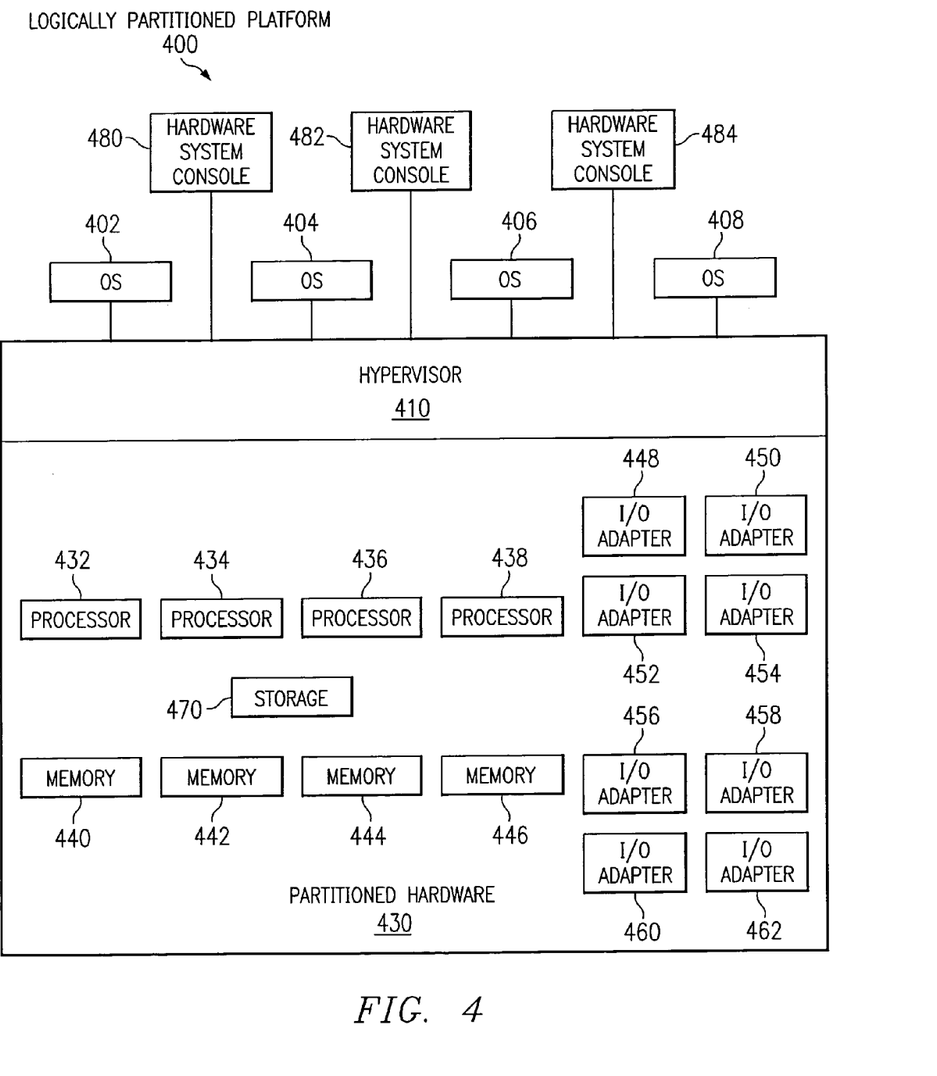
FIG. 4 is a block diagram of an exemplary logically partitioned platform in which the present invention may be implemented.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, performs a number of functions and services for operating system images 402–408 to create and enforce the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Hypervisor 410 provides a secure direct memory access (DMA) window, per I/O adapter, such as, for example, I/O adapter 328 in FIG. 3, on a shared I/O bus, such as, for example, I/O bus 312 in FIG. 3, into the memory resources allocated to its associated OS image, such as, for example, OS image 202 in FIG. 2. The secure DMA window provides access from an I/O adapter to memory which is allocated to the same partition as the I/O adapter, while preventing the I/O adapter from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility Bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly non-contiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the IOAs are allowed to place onto the I/O bus are limited by the range register facility. The range register facility contains a number of registers that hold addresses that are compared to what the I/O adapter is trying to access. If the comparison shows that the I/O adapter is trying to access outside of the range of addresses that were programmed into the range registers by the firmware, then the bridge will not respond to the I/O adapter, effectively blocking the I/O adapter from accessing addresses that it is not permitted to access. In this embodiment, these two hardware mechanisms are placed under the control of the hypervisor.

When platform 400 is initialized, a disjoint range of I/O bus DMA addresses is assigned to each of IOAs 448–462 for the exclusive use of the respective one of IOAs 448–462 by hypervisor 410. Hypervisor 410 then configures the Terminal Bridge range register (not shown) facility to enforce this exclusive use. Hypervisor 410 then communicates this allocation to the owning one of OS images 402–408. Hypervisor also initializes all entries in a particular IOA's associated section of the TCE table to point to a reserved page per image that is owned by the OS image that is allocated to that I/O adapter, such that unauthorized accesses to memory by an I/O adapter will not create an error that could affect one of the other OS images 402–408.

When an owning one of OS images 402–408 requests to map some of its memory for a DMA operation, it makes a call to the hypervisor 410 including parameters indicating the I/O adapter, the memory address range, and the associated I/O bus DMA address range to be mapped. The hypervisor 410 checks that the I/O adapter and the memory address range are allocated to the owning one of OS images 402–408. The hypervisor 410 also checks that the I/O bus DMA range is within the range allocated to the I/O adapter. If these checks are passed, the hypervisor 410 performs the requested TCE mapping. If these checks are not passed, the hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a terminal, such as hardware system console computer 480. In these examples, multiple hardware system consoles are supported. As illustrated, hardware system console 482 and hardware system console 484 also are present.

Hardware system consoles 480–484 are connected directly to logically partitioned platform 400, as illustrated in FIG. 4, or may be connected to logically partitioned platform through a network, such as, for example, network 102 in FIG. 1. These hardware system consoles may be, for example, a desktop computer, a laptop computer, or any other terminal and may be implemented as using data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480. Hypervisor 410 may also perform other functions and services.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

Figure 5:
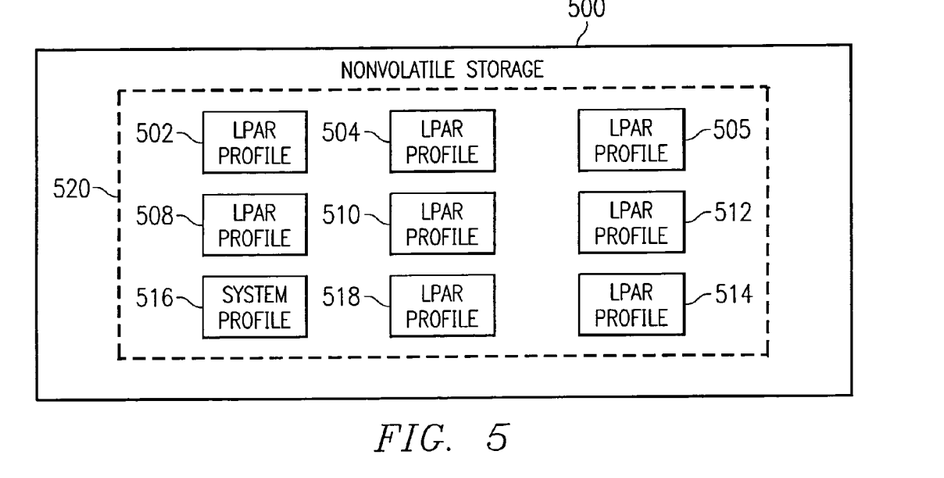
FIG. 5 is a diagram of a nonvolatile storage in accordance with the preferred embodiment of the present invention.

Turning now to FIG. 5, a diagram of a nonvolatile storage is depicted in accordance with the preferred embodiment of the present invention. Nonvolatile storage 500 is an example of a nonvolatile storage, such as NVRAM 368 in FIG. 3. In this example, nonvolatile storage 500 contains LPAR profile 502–518 and system profile 516. LPAR profiles and system profiles 516 are located in HSC save area 520 within nonvolatile storage 500.

Only HSCs are able to access this area in which these profiles are stored. Additionally, HSC save area 520 also may store other objects other than profiles depending on the particular implementation. Each of these profiles may be viewed by any HSC, such as HSCs 480–484 in FIG. 4, connected to a data processing system, such as data processing system 300.

In this manner, the profiles do not have to be stored or managed as each HSC or other terminal that may be used to configure or manage LPARs within data processing system 300. Additionally, if, for example, LPAR profile 504 is updated with changes, this update may be immediately sent to any HSC using that profile. Additionally, if the HSC is turned off, storage of the profile at the particular HSC is not required. Further, mechanisms and processes used to synchronize profiles at the HSCs also are not required with the mechanism of the present invention.

Thus, the present invention provides a method, apparatus, and computer implemented instruction for managing and maintaining profiles for terminals, such as HSCs. This mechanism is implemented in the depicted examples by placing the profiles in a storage on the data processing system in which the LPARs are contained. More specifically, nonvolatile storage, such as NVRAM 368 in FIG. 3 is employed to store the profiles. These profiles may be accessed through requests made to service processor 366 through input/output adapter 370. In these examples, input/output adapter 370 takes the form of a serial port. Of course, other types of input/output adapters may be used, such as, for example, an ethernet adapter or a modem. Additionally, the storage of this information may be located elsewhere than at data processing system 300.

Figure 6:
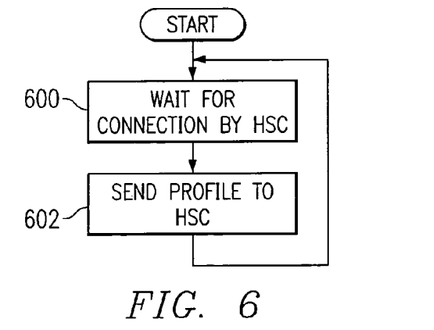
FIG. 6 is a flowchart of a process used for transmitting a profile to a terminal in accordance with the preferred embodiment of the present invention.

Turning now to FIG. 6, a flowchart of a process used for transmitting a profile to a terminal is depicted in accordance with the preferred embodiment of the present invention. In these examples, the process as illustrated in FIG. 6 may be implemented as computer instructions executed by service processor 366 in FIG. 3.

The process begins by waiting for a connection by a hardware system console (step 600). Upon detecting a connection from a HSC, a profile is sent to the HSC (step 602) with the process then returning to step 600. Other commands also may be sent from the HSC to the service processor in addition to retrieving a profile. The profile sent in this example is a profile associated with the particular HSC. The association may be defined in a configuration file on the data processing system.

Figure 7:
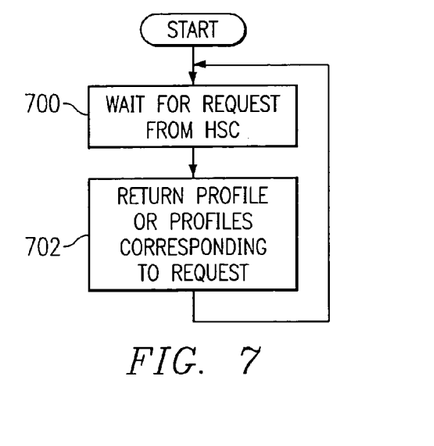
FIG. 7 is a flowchart for a process for handling a request for a profile in accordance with the preferred embodiment of the present invention.

Turning next to FIG. 7, a flowchart for a process for handling a request for a profile is depicted in accordance with the preferred embodiment of the present invention. The process illustrated in FIG. 7 may be implemented as computer instruction executed by service processor 366 in these examples.

The process begins by waiting for a request from the system hardware console (step 700). Upon detecting a request, a profile or profiles corresponding to the request are returned to the HSC (step 702) with the process then returning to step 700.

Figure 8:
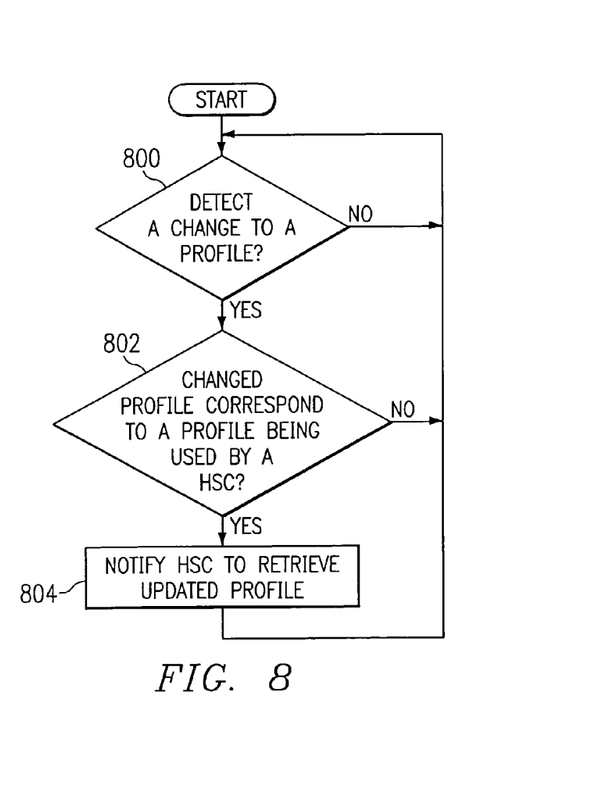
FIG. 8 is a flowchart of a process used for updating and distributing updates of profiles in accordance with the preferred embodiment of the present invention.

Turning next to FIG. 8, a flowchart of a process used for updating and distributing updates of profiles is depicted in accordance with the preferred embodiment of the present invention. The process illustrated in FIG. 8 may be implemented as computer instruction executed by a service processor 366 in FIG. 3.

The process begins by determining whether a change to a profile stored in the nonvolatile storage is detected (step 800). If a change is detected, then a determination is made as to whether the changed profile corresponds to the profile being used by an HSC (step 802). Alternatively, after a change is made by the HSC in the nonvolatile storage, the HSC may send a request to the service processor to notify other HSCs of the update. In response to this action, each HSC will retrieve profile information from the nonvolatile storage. In this case, no further action is required by the service processor to detect a change in the nonvolatile storage. Further, the HSC making a change to a profile may not request a notification to occur when the profile is changed. If the profile corresponds to one being used by a hardware system console, then the profile at the HSC is updated with the changed profile (step 804) with the process then returning to step 800. With reference again to step 802, if the changed profile is not being used by an HSC, the process then returns to step 800 as described above. The process at step 800 continues to return to step 800 until a profile change is detected.

Thus, the present invention provides an improved method, apparatus, and computer implemented instructions for managing profiles for terminals, such as HSCs. This mechanism provides the advantage through storing the profiles for all HSCs at a centralized storage location. In the depicted examples, the centralized storage is a nonvolatile storage, such as an NVRAM located at the data processing system in which the LPARs are located. In this manner, copies of each profile are not required to be maintained at each HSC. Further, synchronization of profiles between HSCs are not required. Further, this mechanism allows for very simple terminals to be used as HSCs. These terminals do not require nonvolatile storage because the profiles are maintained and managed in a nonvolatile storage located at a central location. Further, as HSCs are paired off, added to the system, or replaced by a new HSCs, users do not have to rebuild HSC profiles since each HSC that connects to the data processing system will read one or more profiles from the HSC save area and automatically set up the objects at the HSC.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media such as recordable-type media, floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a set of objects for a plurality of terminals, the method comprising:

storing the set of objects in nonvolatile memory, wherein the set of objects are used to configure a plurality of logical partitions within the data processing system; wherein the plurality of logical partitions includes operating systems that are executing simultaneously;

providing access to the set of objects to the plurality of terminals through a service processors;

responsive to a change in the set of objects made by a terminal within the plurality of terminals, sending notification of the change to the plurality of terminals, wherein the plurality of terminals request objects from the set of objects in response to receiving the notification; and sending the change to the plurality of terminals in response to the request.

2. The method of claim 1, wherein the nonvolatile memory is a nonvolatile random access memory connected to the service processor.

3. The method of claim 1, wherein the set of objects is a set of profiles.

4. The method of claim 1, wherein the change is a change to an object within the set of objects.

5. The method of claim 1, wherein the change is an addition of another object to the set of objects.

6. The method of claim 1, wherein the plurality of terminals is a plurality of hardware system consoles.

7. The method of claim 6, wherein the steps of storing and providing are executed by a service processor and wherein to plurality of hardware system consoles communicate wit to service processor through an input/output unit.

8. A system comprising:

a service processor;

an input/output unit connected to the service processor, wherein the input/output unit sends and receives data; and a nonvolatile memory connected to the service processor, wherein a set of objects are stored in to nonvolatile memory, the set of objects being used by a plurality of terminals to configure logical partitions, and wherein responsive to a change in the set of objects made by terminal within the plurality of terminals, sending notification of to change to the plurality of terminals, wherein the plurality of terminals request objects from to set of objects in response to receiving the notification, and sending the change to the plurality of terminals in response to the request.

9. The system of claim 8, wherein the input/output unit is connected to the service processor by a bus.

10. A data processing system comprising:
   a bus system;
   a plurality of processors;
   a communications unit connected to the bus system, wherein data is sent and received using the communications unit;
   a nonvolatile memory connected to the bus system, wherein a set of instructions are located in the nonvolatile memory; and
   a service processor unit connected to the bus system, wherein the service processor unit executes the set of instructions to store objects for configuring logical partitions within the data processing system, provide access to the objects to a terminal in communication with the service processor unit, send notification of a change in the set of objects to the plurality of terminals in response to a change in the set of objects made by a terminal within the plurality of terminal, wherein the plurality of terminals request objects from the set of objects in response to receiving the notification, and send the change to the plurality of terminals in response to the request.

11. The data processing system claim 10, wherein communications between the service processor and the terminal are facilitated by an input/output unit connected to the service processor.

12. The data processing system of claim 10, wherein the bus system includes a primary bus and a secondary bus.

13. The data processing system claim 10, wherein the communications unit is an Ethernet adapter.

14. The data processing system of claim 10, wherein the input/output unit is at least one of a serial port, an Ethernet adapter, and a modem.

15. A data processing system in a data processing system for managing a set of objects for a plurality of terminals, the data processing system comprising:
   storing means for storing the set of objects in nonvolatile memory, wherein the set of objects arc used to configure a plurality of logical partitions within the data processing system; wherein the plurality of logical partitions includes operating systems that are executing simultaneously;
   providing means for providing access to the set of objects to the plurality of terminals through a service processor;
   sending means for sending notification of a change in the set of objects to the plurality of terminals in response to a change in the set of objects made by a terminal within the plurality of terminals, wherein the plurality of terminals request objects from the set of objects in response to receiving the notification; and
   sending means for sending the change to the plurality of terminals in response to the request.

16. The data processing system of claim 15, wherein the nonvolatile memory is a nonvolatile random access memory connected to the service processor.

17. The data processing system of claim 15, wherein the set of objects is a set of profiles.

18. The data processing system of claim 15, wherein the change is a change to an object within the set of objects.

19. The data processing system of claim 15, wherein the change is an addition of another object to the set of objects.

20. The data processing system of claim 15, wherein the plurality of terminals is a plurality of hardware system consoles.

21. The data processing system of claim 20, wherein the storing means and providing means are located in a service processor and wherein the plurality of hardware system consoles communicate with the service processor through an input/output unit.

22. A computer program product in a computer readable storage medium for use managing a set of objects for a plurality of terminals, the computer program product comprising:
   first instructions for storing the set of objects in nonvolatile memory, wherein the set of objects are used to configure a plurality of logical partitions within the data processing system; wherein the plurality of logical partitions includes operating systems that are executing simultaneously;
   second instructions for providing access to the set of objects to the plurality of terminals through a service processor
   third instructions for sending notification of a change in the set of objects in response to a change in the set of objects made by a terminal within the plurality of terminals, wherein the plurality of terminals request objects from the set of objects in response to receiving the notification; and
   fourth instructions for sending the change to the plurality of terminals in response to the request.

23. The computer program product of claim 22, wherein the nonvolatile memory is a nonvolatile random access memory connected to the service processor.

24. The computer program product of claim 22, wherein the set of objects is a set of profiles.

25. The computer program product of claim 22, wherein the change is a change to an object within the set of objects.

26. The computer program product of claim 22, wherein the change is an addition of another object to the set of objects.

27. The computer program product of claim 22, wherein the plurality of terminals is a plurality of hardware system consoles.

28. The computer program product of claim 27, wherein the first instructions and the second instructions are executed by a service processor and wherein the plurality of hardware system consoles communicate with the service processor through an input/output unit.

* * * * *